(12) United States Patent
Moon

(10) Patent No.: US 11,820,195 B2
(45) Date of Patent: Nov. 21, 2023

(54) FRAME STRUCTURE PROVIDED WITH INDEPENDENT SUSPENSION FOR COMMERCIAL VEHICLE

(71) Applicants: HYUNDAI MOTOR COMPANY, Seoul (KR); KIA MOTORS CORPORATION, Seoul (KR)

(72) Inventor: Yong Woo Moon, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 305 days.

(21) Appl. No.: 17/103,453

(22) Filed: Nov. 24, 2020

(65) Prior Publication Data

US 2022/0009301 A1    Jan. 13, 2022

(30) Foreign Application Priority Data

Jul. 13, 2020  (KR) .......................... 10-2020-0086187

(51) Int. Cl.
| | |
|---|---|
| *B60G 7/00* | (2006.01) |
| *B62D 21/11* | (2006.01) |
| *B62D 31/04* | (2006.01) |
| *B62D 21/02* | (2006.01) |
| *B60G 3/20* | (2006.01) |

(52) U.S. Cl.
CPC ............ *B60G 7/001* (2013.01); *B60G 3/20* (2013.01); *B62D 21/02* (2013.01); *B62D 21/11* (2013.01); *B62D 31/04* (2013.01)

(58) Field of Classification Search
CPC .......... B60G 7/001; B60G 3/20; B62D 21/02; B62D 21/11; B62D 31/04; B62D 31/02; B62D 23/00; B62D 21/18; B62D 21/15; B60Y 2200/143; B60Y 2200/91
See application file for complete search history.

(56) References Cited

U.S. PATENT DOCUMENTS

| | | | | |
|---|---|---|---|---|
| 4,462,632 A | * | 7/1984 | Grassl, Sr. ............. | B62D 21/02 296/205 |
| 4,500,112 A | * | 2/1985 | Raidel .................... | B60G 11/27 280/124.109 |
| 4,529,224 A | * | 7/1985 | Raidel .................... | B60G 9/003 280/124.109 |

(Continued)

*Primary Examiner* — Drew J Brown
*Assistant Examiner* — Tiffany L Webb
(74) *Attorney, Agent, or Firm* — LEMPIA SUMMERFIELD KATZ LLC

(57) ABSTRACT

A frame structure of a commercial vehicle having an independent suspension system may include: a front outrigger mounted at lower front ends of wheel housings along a wide direction of a vehicle; a rear outrigger mounted at lower rear ends of the wheel housings along the width direction, wherein the wheel housings are arranged between the front and rear outriggers in a vehicle body length direction; a center reinforce unit mounted on an inner lower side of the wheel housing and disposed between the wheel housings, the center reinforce unit configured to connect the front and rear outriggers along the vehicle body length direction; a side reinforce unit mounted on an inner side of the wheel housing and connected to the center reinforce unit; and a lower reinforce unit configured to be connected to the center reinforce unit and coupled to the first suspension mounting assembly through the rear outrigger.

15 Claims, 16 Drawing Sheets

(56) References Cited

U.S. PATENT DOCUMENTS

| | | | | |
|---|---|---|---|---|
| 4,596,402 | A * | 6/1986 | Raidel | B60G 11/27 |
| | | | | 280/124.109 |
| 4,726,166 | A * | 2/1988 | DeRees | B62D 25/2036 |
| | | | | 52/696 |
| 5,112,082 | A * | 5/1992 | Clelland | B62D 21/02 |
| | | | | 280/783 |
| 5,501,504 | A * | 3/1996 | Kunz | B62D 25/2054 |
| | | | | 280/783 |
| 5,863,070 | A * | 1/1999 | Williams | B62D 31/02 |
| | | | | 280/789 |
| 7,097,232 | B2 * | 8/2006 | Beaudry | B62D 31/02 |
| | | | | 180/311 |
| 7,175,202 | B2 * | 2/2007 | Budica | B62D 21/02 |
| | | | | 280/781 |
| 7,559,578 | B2 * | 7/2009 | van Leeve | B62D 21/02 |
| | | | | 180/311 |
| 7,717,464 | B2 * | 5/2010 | Leeve | B62D 33/04 |
| | | | | 280/788 |
| 9,381,952 | B2 * | 7/2016 | Furusaki | B62D 21/152 |
| 2002/0105170 | A1 * | 8/2002 | Smith | B60G 5/053 |
| | | | | 280/683 |
| 2007/0290495 | A1 * | 12/2007 | Biscan | B62D 21/20 |
| | | | | 280/789 |
| 2009/0096253 | A1 * | 4/2009 | Yatsuda | B62D 25/2036 |
| | | | | 296/193.09 |
| 2010/0176570 | A1 * | 7/2010 | Smith | B60G 3/20 |
| | | | | 280/124.138 |
| 2011/0121554 | A1 * | 5/2011 | Olson | B62D 21/152 |
| 2019/0111976 | A1 * | 4/2019 | Kitamura | B23K 26/0093 |

* cited by examiner

FRAME STRUCTURE PROVIDED WITH INDEPENDENT SUSPENSION FOR COMMERCIAL VEHICLE

CROSS-REFERENCE TO RELATED APPLICATION

This application claims priority to and the benefit of Korean Patent Application No. 10-2020-0086187, filed on Jul. 13, 2020, the entire contents of which are incorporated herein by reference.

FIELD

The present disclosure relates to a frame structure of a large commercial vehicle.

BACKGROUND

The statements in this section merely provide background information related to the present disclosure and may not constitute prior art.

In general, large commercial vehicles, particularly buses, are one of the means of transport capable of transporting a large number of people. Recently, a two-story electric bus has been applied in consideration of the environment and the increase of passengers.

The two-story electric bus of such a large commercial vehicle employs an independent suspension system which is advantageous in terms of ride comfort, rolling stability and steering stability compared to non-independent suspension systems.

In the case of such a two-story electric bus, securing the strength and rigidity of the vehicle body should be considered as the top priority. However, we have discovered that as the panel structure is applied to reinforce the frame, the strength and rigidity of the vehicle body are deteriorated.

The above information disclosed in this Background section is only for enhancement of understanding of the background of the disclosure, and therefore it may contain information that does not form the prior art that is already known to a person of ordinary skill in the art.

SUMMARY

The present disclosure provides a frame structure of a commercial vehicle applying an independent suspension system that is advantageous in terms of strength and rigidity through reinforcement of the closed cross-section members, and that allows the load of the suspension to be distributed.

A frame structure of a commercial vehicle applying an independent suspension system according to one form of the present disclosure may include front and rear outriggers mounted along the vehicle width direction at the lower front and rear ends of wheel housings with the wheel housings interposed therebetween, a center reinforce unit mounted on an inner lower side of the wheel housing at the center side between the wheel housings, and connecting the front and rear outriggers along the vehicle body length direction, a side reinforce unit mounted on the inner side of the wheel housing and connected to the center reinforce unit, and a lower reinforce unit mounted to be connected to the center reinforce unit and coupled to the first suspension mounting assembly through the rear outrigger.

The frame structure may further include a front reinforce unit mounted on the inner front side of the wheel housing and connected to the front outrigger and the side reinforce unit, and a rear reinforce unit mounted on the inner rear side of the wheel housing and connected to the rear outrigger and the side reinforce unit.

The frame structure may further include an upper reinforce unit mounted on the inner upper surface of the wheel housing and connected to the side reinforce unit.

The frame structure may further include a second suspension mounting assembly mounted on the front outrigger.

The frame structure may further include a third suspension mounting assembly mounted on the side reinforce unit.

The front and rear outriggers may be formed in the form of a rectangular cross-section box in which channel members having a "U"-shaped cross-section are joined together.

The center reinforce unit may include a plurality of first reinforce members mounted on the side reinforce unit, provided in the form of a rectangular cross-section box in which channel members of a "U"-shaped cross-section are joined to each other, and disposed along the vehicle body length direction, and a plurality of second reinforce members mounted on the side reinforce unit, provided in the form of a square cross-section pipe, and disposed in up and down directions between the first reinforce members.

The center reinforce unit may further include a third reinforce member mounted on the lower surface of the first reinforce member, and provided in the form of a square cross-section pipe, a fourth reinforce member having a "U" shaped cross-section that is mounted on the lower surface of the first reinforce member and opened in the lower direction, and a fifth reinforce member with having a "U" shaped cross-section that is mounted on the lower surfaces of the first reinforce members and opened in the upward direction.

The side reinforce unit may include a side lower reinforce member in the form of a square cross-section pipe connected to the center reinforce unit and mounted along the vehicle body length direction on the lower inner side of the wheel housing, and a side upper reinforce member provided in a pair and in the form of a square cross-section pipe disposed to be spaced apart from the side lower reinforce member, and mounted along the vehicle body length direction on the side of the wheel housing.

The side reinforce unit may further include first connecting members in the form of a square cross-section pipe connecting the side lower reinforce member and the side upper reinforce member in up and down directions between the side lower reinforce member and the side upper reinforce member, and second connecting members in the form of square cross-section pipes that connect the side upper reinforce member and the upper surface of the wheel housing and are disposed of in the up and down directions.

The lower reinforce unit may include a front upper channel plate connected with the center reinforce unit along the vehicle width direction, a front lower channel plate coupled to the lower surface of the front upper channel plate, a rear upper channel plate disposed apart from the front upper channel plate and connected to the center reinforce unit along the vehicle width direction, and a rear lower channel plate joined to the bottom of the rear upper channel plate.

The lower reinforce unit may further include a center plate connecting the front upper channel plate and the rear upper channel plate between the front upper channel plate and the rear upper channel plate, and a center lower channel member connected to the bottom of the center plate.

The front and rear reinforce unit may include a plurality of first pipe members formed with a rectangular cross-section shape and disposed along the vehicle width direction, and a plurality of second pipe members formed with a rectangular cross-section shape, connected to the first pipe members and disposed in up and down directions.

The upper reinforce unit may include at least one third pipe member formed with a rectangular cross-section shape and mounted in an arch form on the inner upper surface of the wheel housing, and a fourth pipe member formed with a square cross-section shape and connected to the third pipe member in the vehicle width direction.

A third suspension mounting assembly may be mounted on the side reinforce unit, wherein the third suspension mounting assembly may include a pair of first mounting bracket mounted on the side upper reinforce member, and a second mounting bracket installed through a reinforce panel to the first connecting member between the first mounting brackets.

The frame structure according to one form of the present disclosure may be configured in the vehicle body of a large commercial vehicle including a two-story electric bus.

One form of the present disclosure is advantageous in terms of strength and rigidity, and durability of the frame structure of the vehicle body can be increased more stably.

In addition, the effect obtained or predicted by the present disclosure will be disclosed directly or implicitly in the detailed description of the present disclosure. That is, various effects predicted according to the present disclosure will be disclosed within a detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 14:
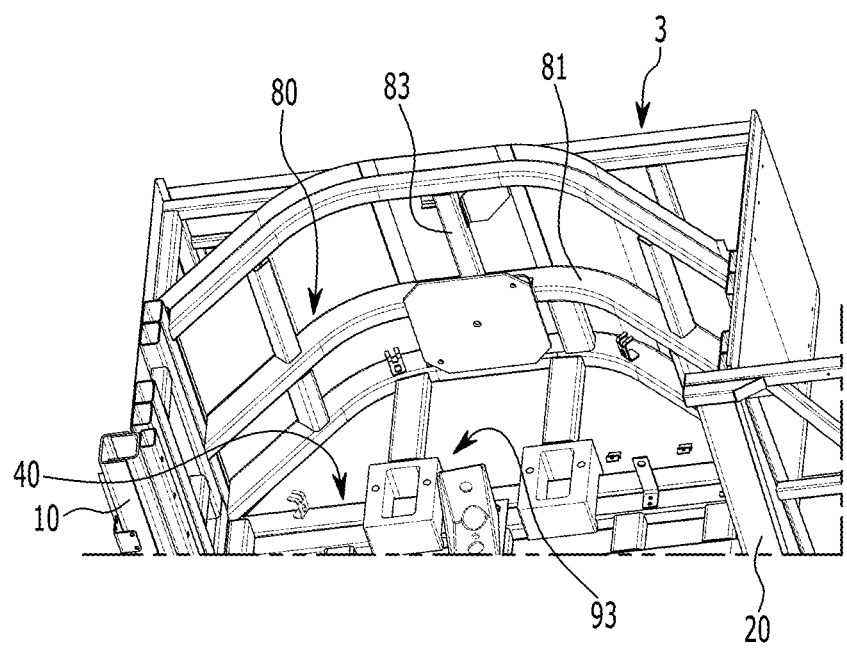
Figure 15:
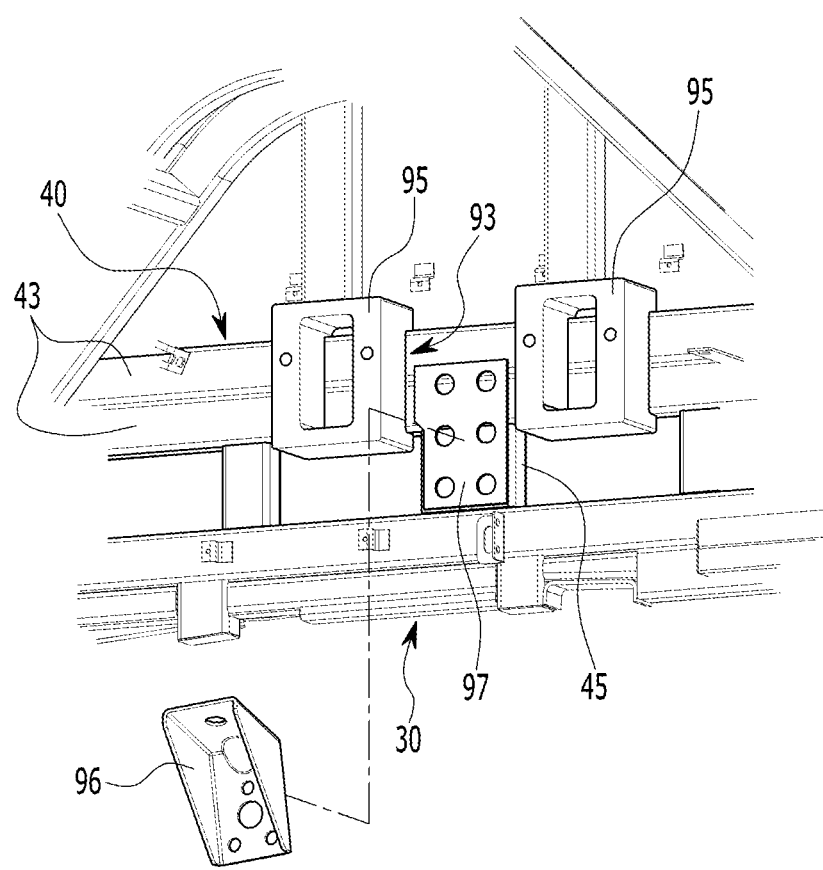

FIG. 14 is a drawing showing an upper reinforcement unit applied to the frame structure of a commercial vehicle applying an independent suspension system according to one form of the present disclosure; and FIG. 15 is a drawing showing a third suspension mounting assembly applied to the frame structure of a commercial vehicle applying an independent suspension system according to one form of the present disclosure.

The drawings described herein are for illustration purposes only and are not intended to limit the scope of the present disclosure in any way.

DETAILED DESCRIPTION

The present disclosure will be described more fully hereinafter with reference to the accompanying drawings, in which various forms of the disclosure are shown. As those skilled in the art would realize, the described forms may be modified in various different ways, all without departing from the spirit or scope of the present disclosure.

In order to clearly describe the present disclosure, parts irrelevant to the description are omitted, and the same reference numerals are assigned to the same or similar components throughout the specification.

The size and thickness of each component shown in the drawing are shown arbitrarily for convenience of explanation, so the present disclosure is not necessarily limited to what is shown in the drawing.

In addition, in the following detailed description, the name of the configuration is divided into first, second, etc. to distinguish the configuration by the same relationship, and in the following description, the order is not necessarily limited.

In the entire specification, when a certain part includes a certain constituent element, this means that other constituent elements may be further included rather than excluding other constituent elements unless otherwise stated.

In addition, terms such as . . . unit, . . . means, etc. described in the specification mean a unit of a comprehensive configuration that performs at least one function or operation.

Figure 1:
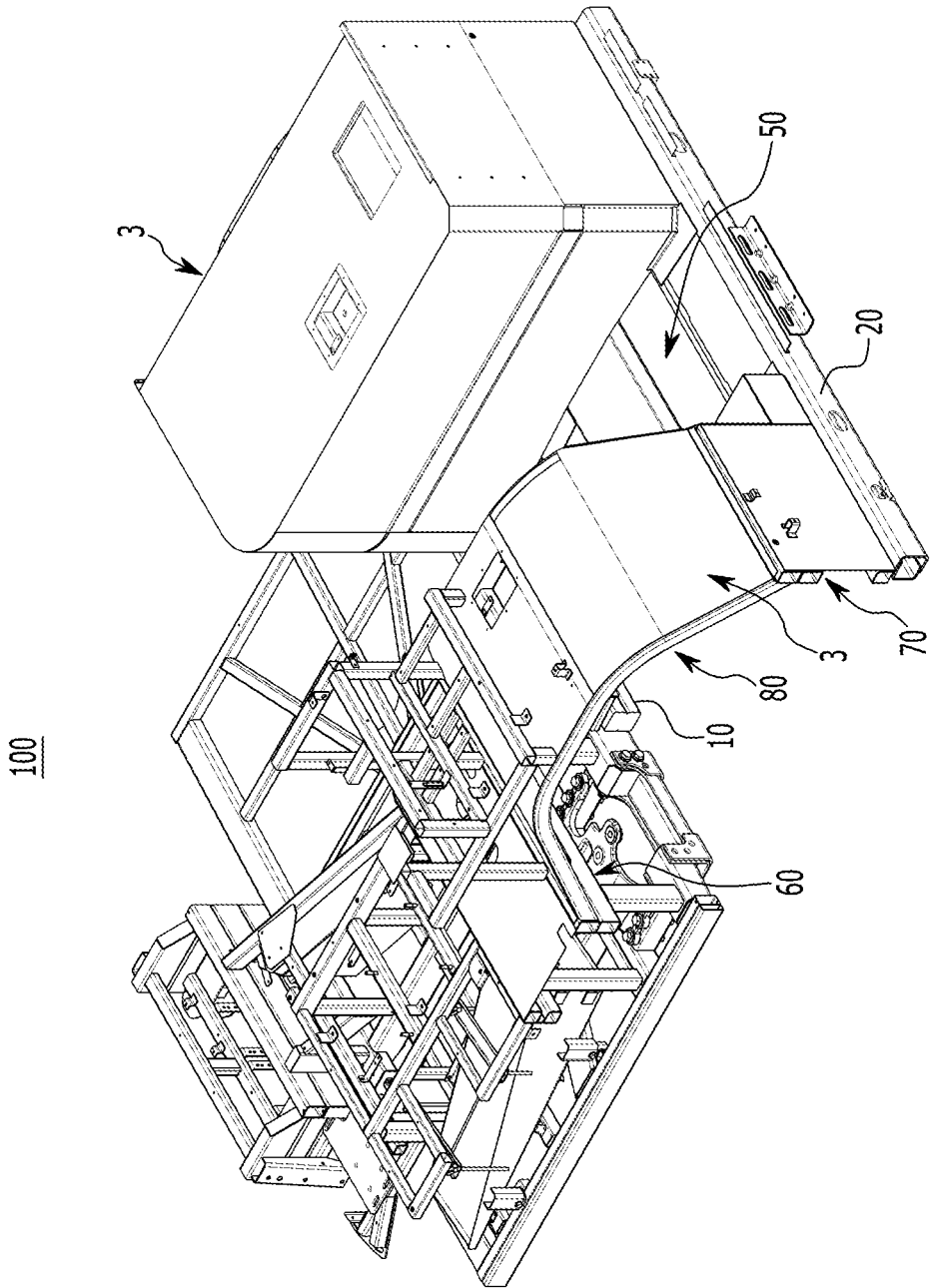
FIGS. 1 and 2 are perspective views showing a frame structure of a commercial vehicle applying an independent suspension system according to one form of the present disclosure.
Figure 2:
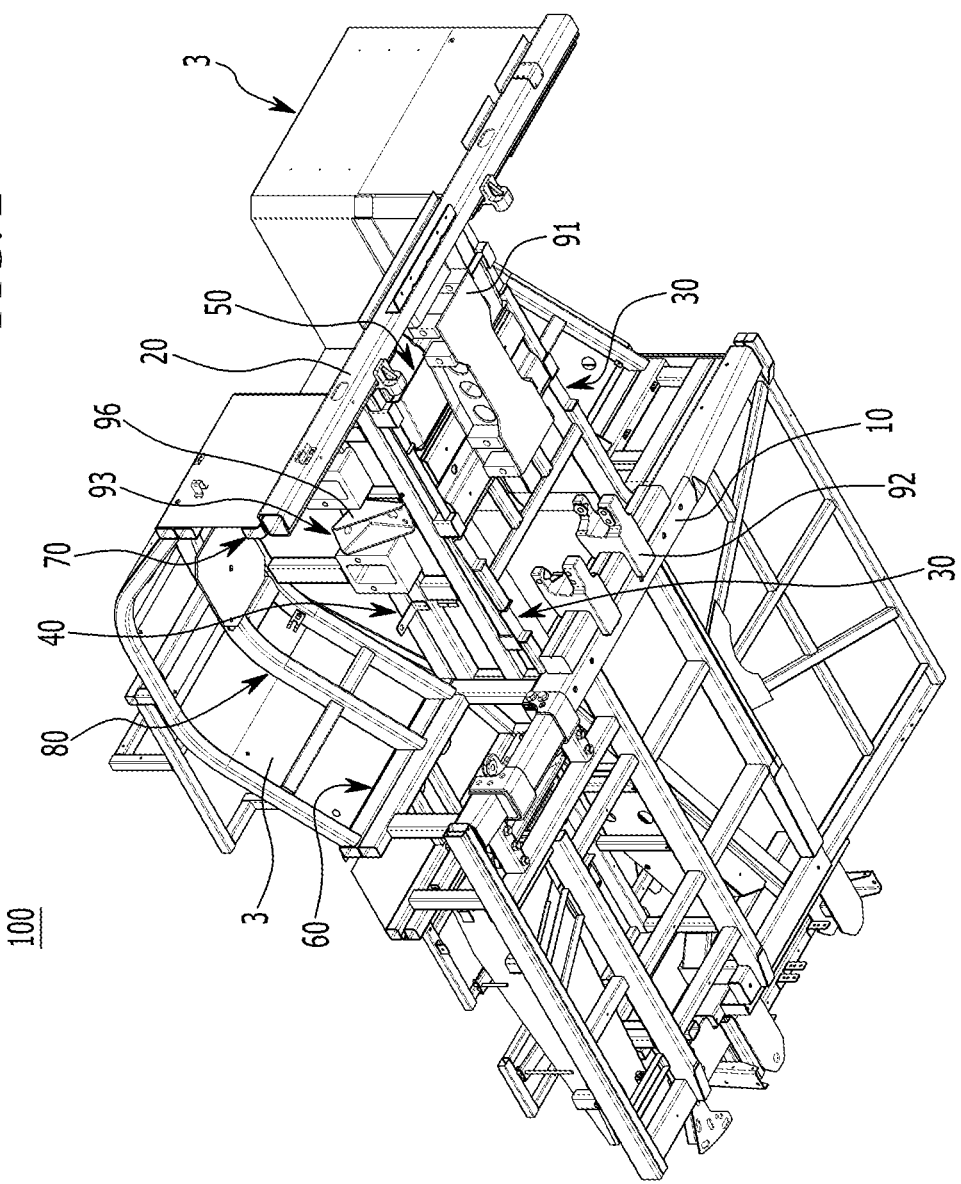
Figure 3:
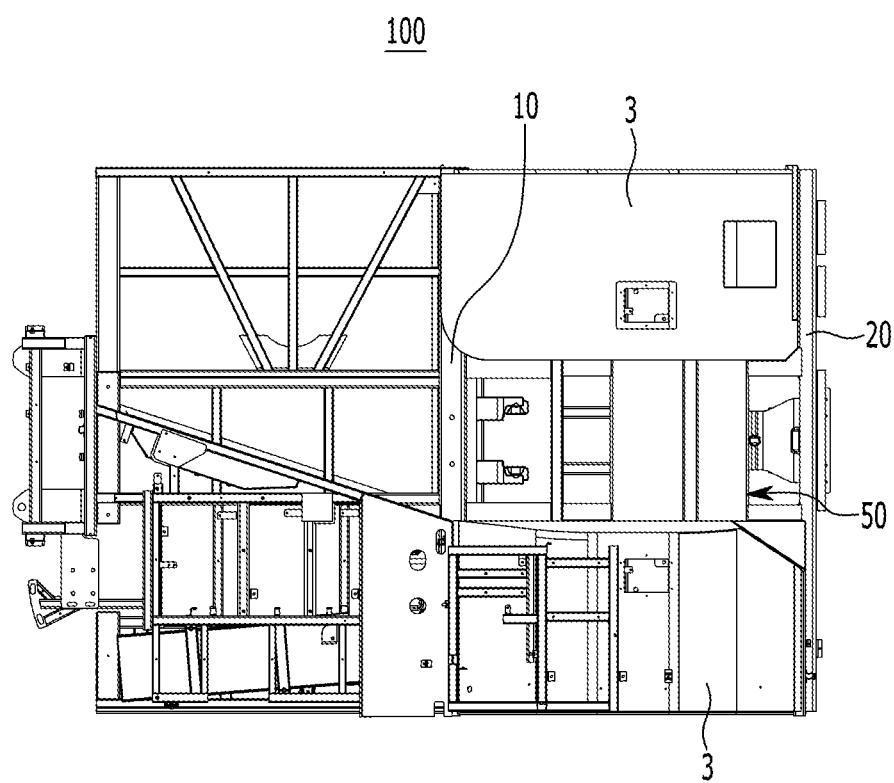
FIG. 3 is a plan view showing the frame structure of a commercial vehicle applying an independent suspension system according to one form of the present disclosure.
Figure 4:
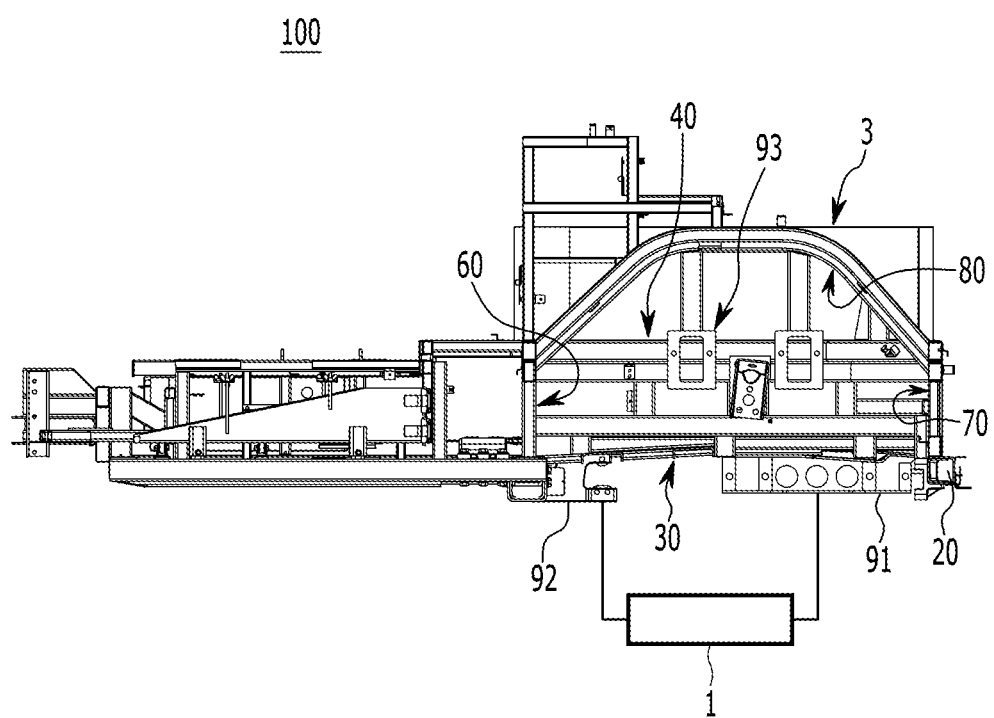
FIG. 4 is a side schematic diagram showing the frame structure of a commercial vehicle applying an independent suspension system according to one form of the present disclosure.

FIG. 1 and FIG. 2 are perspective views showing a frame structure of a commercial vehicle applying an independent suspension system according to one form of the present disclosure, and FIG. 3 is a plan view showing the frame structure of a commercial vehicle applying an independent suspension system according to one form of the present disclosure.

Referring to FIG. 1 to FIG. 4, a frame structure 100 of a commercial vehicle according to one form of the present disclosure can be applied to a large commercial vehicle that independently connects each wheel to the vehicle body frame through an independent suspension system.

One form of the present disclosure can be applied to the frame structure 100 connected to suspension 1 in the vehicle body of a large commercial vehicle including an ultra-low-floor bus and a two-story electric bus as a large bus to which an independent suspension system is applied. Furthermore, the large commercial vehicle described above may include a general urban bus such as an electric bus and a hydrogen bus, an express bus, an articulated bus, and a two-story hydrogen bus as a large bus.

The suspension in the independent suspension system (1; referring to FIG. 4) includes a lower arm, a tie-rod, and an upper arm. Since the configuration of the suspension 1 is well known in the art, a more detailed description of the configuration in this specification will be omitted.

In describing the frame structure 100 of a commercial vehicle according to one form of the present disclosure, the suspension 1 is described as front suspension 1 for convenience of understanding, but is not limited thereto, the same configuration can be applied to the rear suspension.

The frame structure 100 according to one form of the present disclosure includes wheel housings 3 provided on both front sides. The wheel housing 3, which supports a wheel, includes an inner side, an inner front and rear sides, and an inner top side.

In the industry, the vehicle width direction is called L direction, the front and rear direction of the vehicle body is called the T direction, and the height direction of the vehicle body is called H direction. However, in one form of the present disclosure, instead of setting the LTH direction as described above as the reference direction, the constituent elements in the following will be described by setting the vehicle width direction, vehicle body length direction and up and down direction.

The frame structure 100 of a commercial vehicle applying the independent suspension system according to one form of the present disclosure is advantageous in terms of strength and rigidity through reinforcement of the closed cross-section members, and the load of the front suspension 1 can be distributed.

The frame structure 100 of a commercial vehicle applying the independent suspension system according to one form of the present disclosure includes front and rear outriggers 10, 20, a center reinforce unit 30, a side reinforce unit 40, a lower reinforce unit 50, front and rear reinforce units 60, 70, and an upper reinforce unit 80.

The front and rear outriggers 10, 20 are mounted along the vehicle width direction on the lower front and lower rear ends of the wheel housings 3. The wheel housings 3 are interposed between the front outrigger and the rear outrigger in a longitudinal direction of the vehicle.

The wheel housing 3 is positioned between the front and rear outriggers 10, 20, and various members, brackets, etc. as a center part are provided between the wheel housing 3.

The rear outrigger 20 is connected to a first suspension mounting assembly 91, which is connected to the lower arm of the front suspension 1. And the front outrigger 10 is connected to a second suspension mounting assembly 92 connected to the tie-rod of front suspension 1, etc.

Figure 5A:
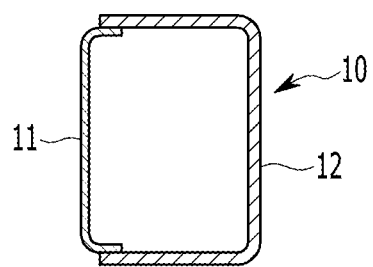
FIGS. 5A and 5B are cross-sectional views of front and rear outriggers applied to the frame structure of a commercial vehicle with an independent suspension system according to one form of the present disclosure.
Figure 5B:
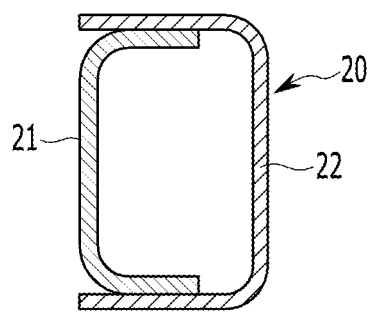

FIGS. 5A and 5B are cross-sectional views of front and rear outriggers applied to the frame structure of a commercial vehicle with an independent suspension system according to one form of the present disclosure.

The front and rear outriggers 10 and 20 are, as shown in FIGS. 5A and 5B, formed in the form of a rectangular cross-section box in which channel members 11, 12, 21, 22 having a "U" shaped cross-section are joined together.

Referring to FIG. 1 to FIG. 4, the center reinforce unit 30 is the reinforcement of the center section mentioned above and is mounted on the inner lower side of the wheel housings 3 at the center between each wheel housing 3. In addition, the center reinforce unit 30 functions to reinforce the lower end, including the inner lower side of the wheel housings 3.

Figure 6:
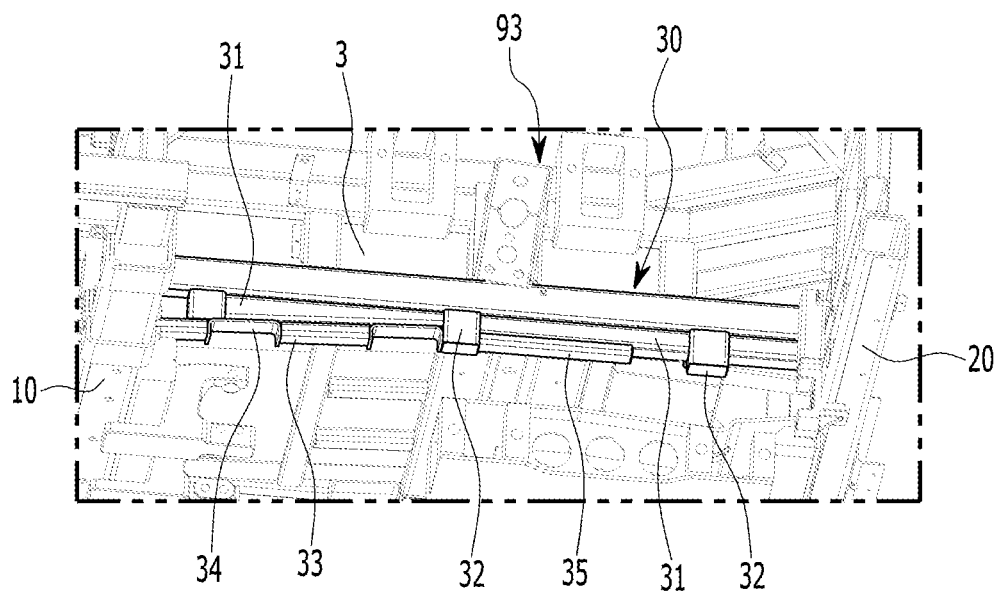
FIG. 6 is a drawing showing a center reinforcement unit applied to the frame structure of a commercial vehicle applying an independent suspension system according to one form of the present disclosure.

FIG. 6 is a drawing showing a center reinforcement unit applied to the frame structure of a commercial vehicle applying an independent suspension system according to one form of the present disclosure, and FIGS. 7A, 7B, 7C, 7D and 7E are cross-sectional views of a center reinforcement unit applied to the frame structure of a commercial vehicle with an independent suspension system according to one form of the present disclosure.

The center reinforce unit 30 can connect the front and rear outriggers 10, 20 along the vehicle body length direction. This center reinforce unit 30 may include first to fifth reinforce members 31, 32, 33, 34, 35.

The first reinforce member 31 is mounted on the side reinforce unit 40, which will be further described later, may be provided in plural, and is disposed along the vehicle body length direction.

Figure 7A:
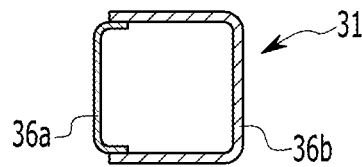
FIGS. 7A, 7B, 7C, 7D and 7E are cross-sectional views of a center reinforcement unit applied to the frame structure of a commercial vehicle with an independent suspension system according to one form of the present disclosure.

The first reinforce member 31 is provided in the form of a rectangular cross-section box in which channel members 36a and 36bs of a "U" shaped cross-section are joined to each other as shown in FIG. 7A.

Figure 7B:
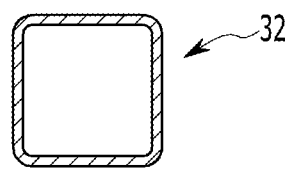
Figure 7C:
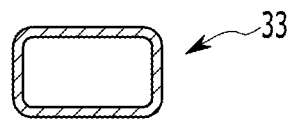

The second reinforce member 32 is mounted on the side reinforce unit 40, is provided in plural, and is disposed between the first reinforce members 31 in up and down directions. As shown in FIG. 7B, the second reinforce member 32 is provided in the form of a square cross-section pipe.

The third reinforce member 33 is mounted on the bottom of the first reinforce member 31. As shown in 7C, the third reinforce member 33 is provided in the form of a square cross-section pipe.

Figure 7D:

The fourth reinforce member 34 is mounted on the lower surface of the first reinforce member 31, and is provided in a "U" shaped cross-section channel open in the lower direction as shown in FIG. 7D.

Figure 7E:
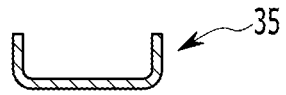

And, the fifth reinforce member 35 is mounted on the lower surface of the first reinforce member 31, and is provided in a "U" shaped cross-section channel open in the upward direction as shown in FIG. 7E.

Referring to FIG. 1 to FIG. 4, the side reinforce unit 40 is to reinforce the side of the wheel housing 3. The side reinforce unit 40 is mounted on the inner side of the wheel housing 3 and is connected to the center reinforce unit 30.

Figure 8:
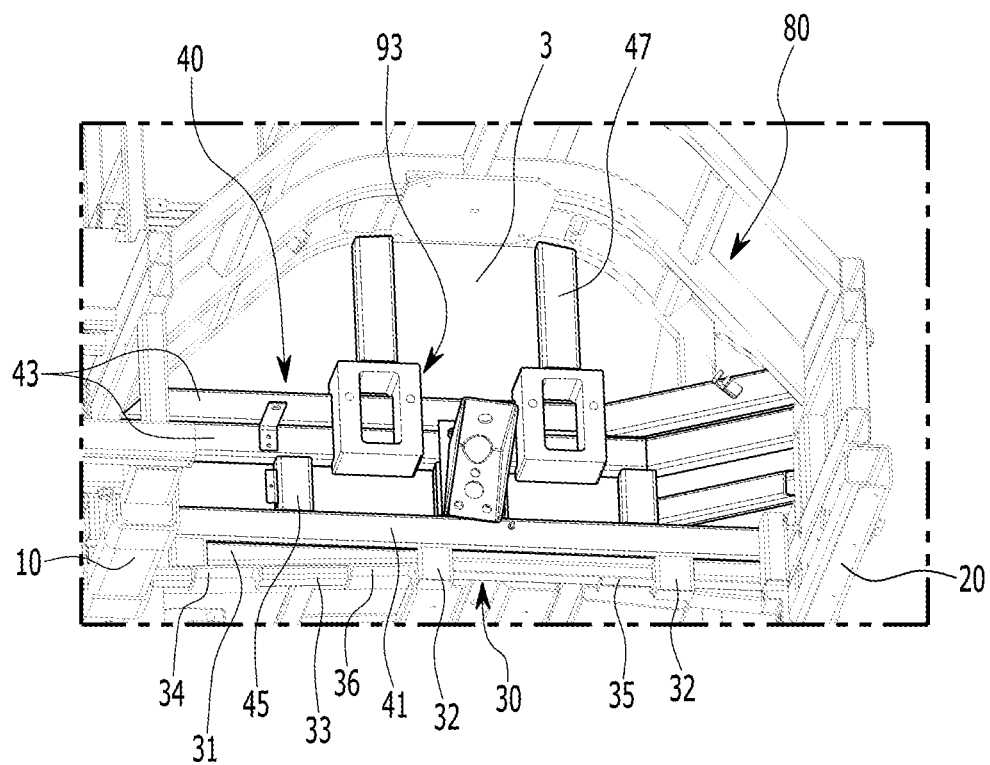
FIG. 8 is a drawing showing a side reinforcement unit applied to the frame structure of a commercial vehicle applying an independent suspension system according to one form of the present disclosure.
Figure 9A:
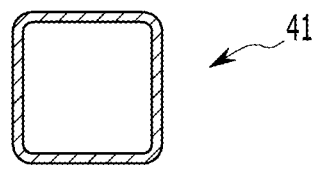
FIGS. 9A, 9B and 9C are cross-sectional views of a side reinforcement unit applied to the frame structure of a commercial vehicle applying an independent suspension system according to one form of the present disclosure.
Figure 9B:
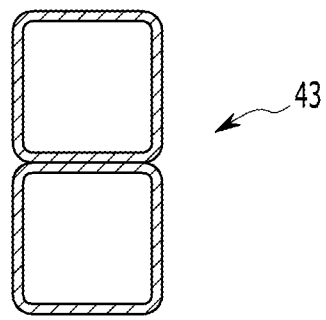
Figure 9C:
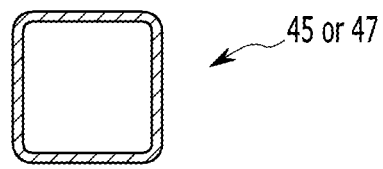

FIG. 8 is a drawing showing a side reinforcement unit applied to the frame structure of a commercial vehicle applying an independent suspension system according to one form of the present disclosure, and FIGS. 9A, 9B and 9C are cross-sectional views of a side reinforcement unit applied to the frame structure of a commercial vehicle applying an independent suspension system according to one form of the present disclosure.

The side reinforce unit 40 includes a side lower reinforce member 41, a side upper reinforce member 43, a first connecting member 45, and a second connecting member 47.

The side lower reinforce member 41 is connected to the center reinforce unit 30, and is mounted along the vehicle body length direction on the lower side of the inner side of the wheel housing 3. The side lower reinforce member 41 is provided in the form of a square cross-section pipe.

The side upper reinforce member 43 may be provided as a pair combined in the up and down directions, disposed apart from the side lower reinforce member 41 in the upper direction, and be mounted along the vehicle body length direction on the side of the wheel housing 3. The side upper reinforce member 43 is provided in the form of a square cross-section pipe.

The first connecting member 45 may be provided in plural, disposed between the side lower reinforce member 41 and the side upper reinforce member 43, and provided in the form of a square cross-section pipe. The first connecting member 45 connects the side lower reinforce member 41 and the side upper reinforce member 43 in the up and down directions.

The second connecting member 47 may be provided in plural, disposed in up and down directions and connected to the side upper reinforce member 43 and the upper surface of the wheel housing 3. The second connecting member 47 is provided in the form of a square cross-section pipe.

Referring to FIG. 1 to FIG. 4, the lower reinforce unit 50 is a part that is substantially connected to the front suspension 1, reinforcing the lower part of the center between the wheel housing 3.

The lower reinforce unit 50 is connected to the center reinforce unit 30, and is coupled to the first suspension mounting assembly 91 through the rear outrigger 20.

Figure 10:
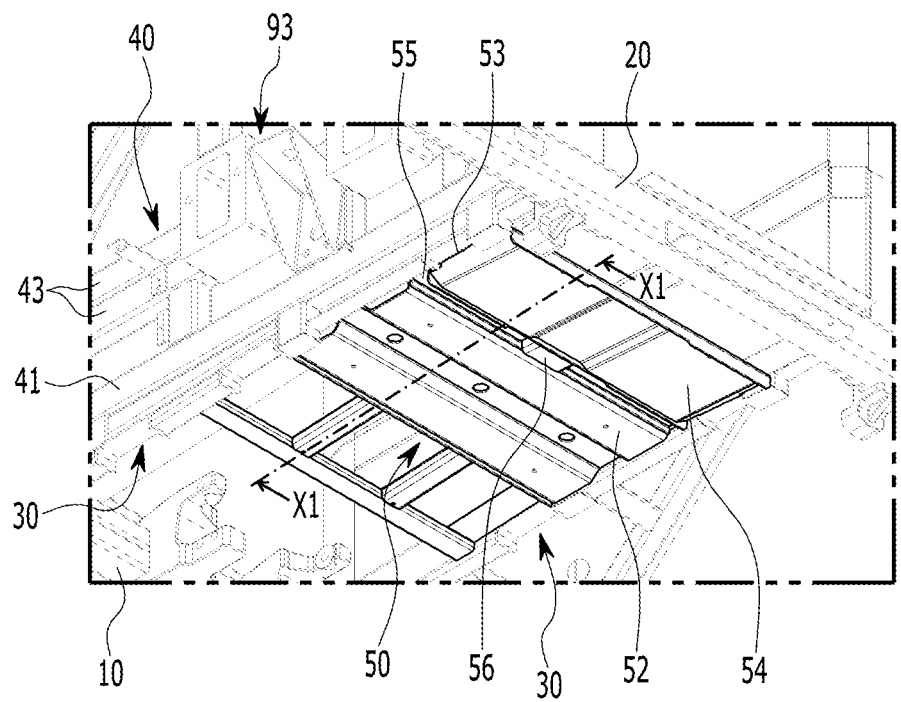
FIG. 10 is a drawing showing a lower reinforcement unit applied to the frame structure of a commercial vehicle applying an independent suspension system according to one form of the present disclosure.
Figure 11:
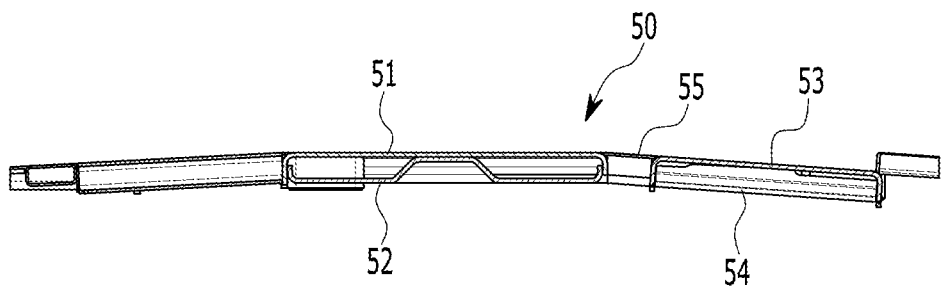
FIG. 11 is a cross-sectional view along line XI-XI of FIG. 10.
Figure 12:
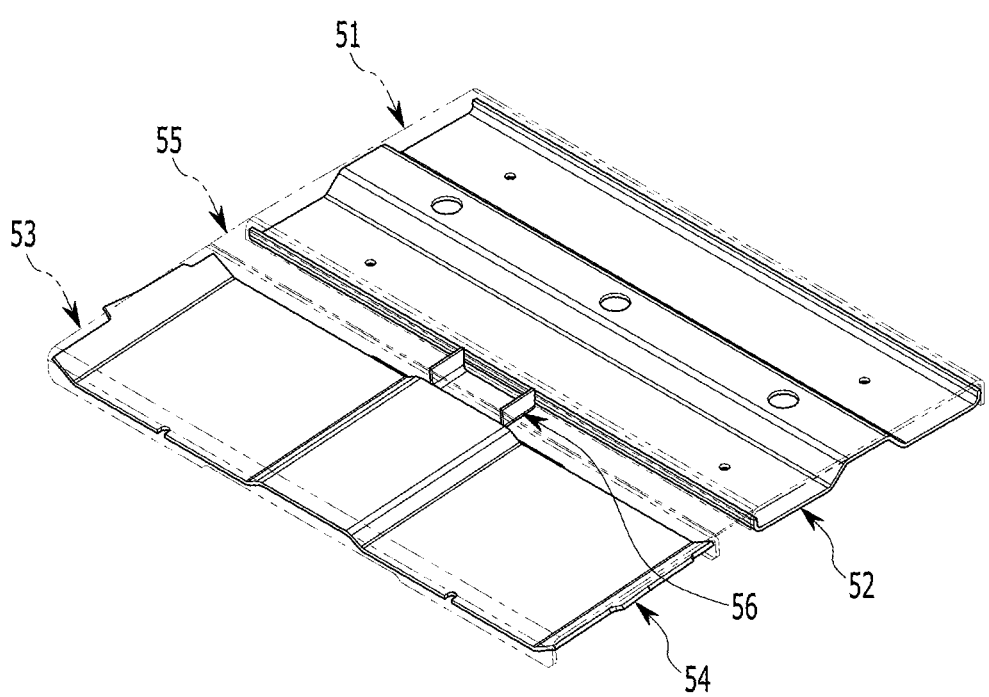
FIG. 12 is a projection view of a lower reinforcement unit applied to the frame structure of a commercial vehicle applying an independent suspension system according to one form of the present disclosure.

FIG. 10 is a drawing showing a lower reinforcement unit applied to the frame structure of a commercial vehicle applying an independent suspension system according to one form of the present disclosure, FIG. 11 is a cross-sectional view along line XI-XI of FIG. 10, and FIG. 12 is a projection view of a lower reinforcement unit applied to the frame structure of a commercial vehicle applying an independent suspension system according to one form of the present disclosure.

The lower reinforce unit 50 includes a front upper channel plate 51, a front lower channel plate 52, a rear upper channel plate 53, a rear lower channel plate 54, a center plate 55, and a center lower channel member 56.

The front upper channel plate 51 is connected to the center reinforce unit 30 along the vehicle width direction.

The front lower channel plate 52 has a shape corresponding to the front upper channel plate 51 and is coupled to the lower surface of the front upper channel plate 51. The front lower channel plate 52 is connected to the lower edge portion and the center portion of the front upper channel plate 51, and forms a plurality of channels together with the front upper channel plate 51.

The rear upper channel plate 53 is disposed to be spaced apart from the front upper channel plate 51, and is connected to the center reinforce unit 30 along the vehicle width direction. The rear upper channel plate 53 may form a single channel having a predetermined width.

The rear lower channel plate 54 has a shape corresponding to the rear upper channel plate 53 and is coupled to the lower surface of the rear upper channel plate 53. The rear lower channel plate 54 is joined to the lower edge of the rear upper channel plate 53 and forms a channel together with the rear upper channel plate 53.

The center plate 55 connects the front upper channel plate 51 and the rear upper channel plate 53 between the front upper channel plate 51 and the rear upper channel plate 53. The center plate 55 is joined to the front upper channel plate 51 and the rear upper channel plate 53 through the edges of both sides along the vehicle width direction.

And, the center lower channel member 56 is connected to the lower surface of the center plate 55. The center lower channel member 56 forms a channel with an open top and is joined to the lower surface of the center plate 55.

Referring to FIG. 1 to FIG. 4, the front and rear reinforce units 60, 70 are to reinforce the inner front and rear sides of the wheel housing 3.

Figure 13A:
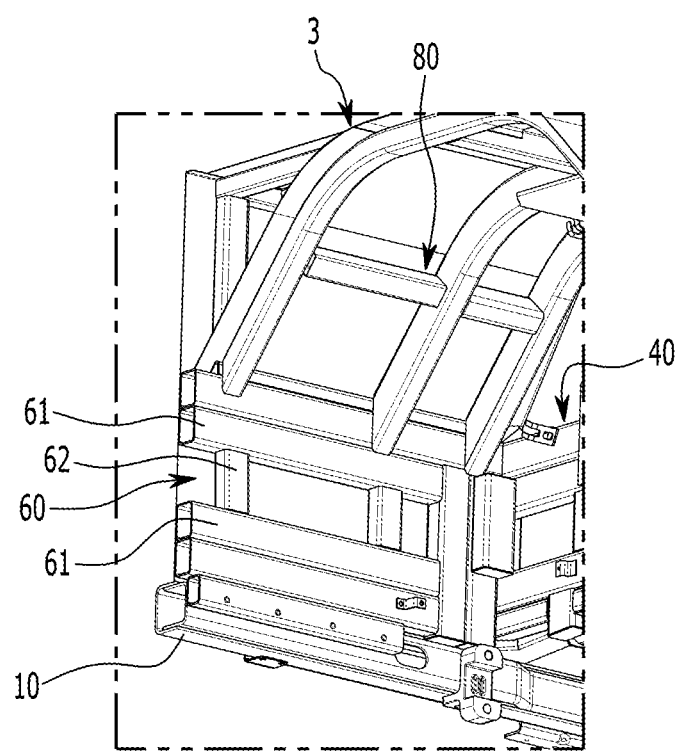
FIGS. 13A and 13B are drawings showing front and rear reinforcement units applied to the frame structure of a commercial vehicle applying an independent suspension system according to one form of the present disclosure.
Figure 13B:
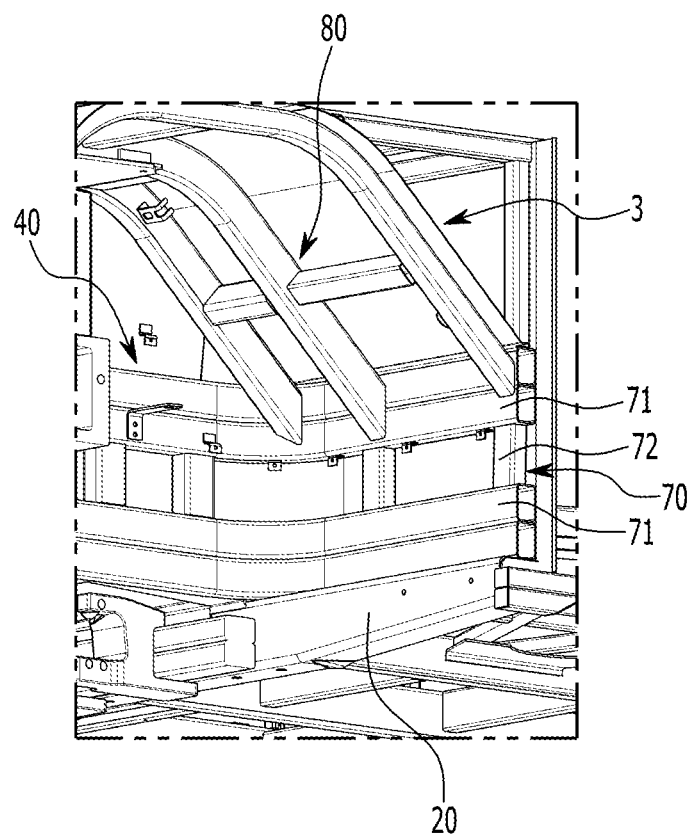

FIGS. 13A and 13B are drawings showing front and rear reinforcement units applied to the frame structure of a commercial vehicle applying an independent suspension system according to one form of the present disclosure.

The front reinforce unit 60 is mounted on the inside front of the wheel housing 3 and is connected to the front outrigger 10 and the side reinforce unit 40. The rear reinforce unit 70 is mounted on the inner rear of the wheel housing 3, and is connected to the rear outrigger 20 and the side reinforce unit 40, respectively.

Such front and rear reinforce units 60, 70 include a plurality of first pipe members 61, 71, and a plurality of second pipe members 62, 72, respectively.

The first pipe members 61, 71 have a square cross-section and are disposed along the vehicle width direction. And, the second pipe members 62, 72 have a rectangular cross-section shape, are connected to the first pipe members 61, 71, and are disposed in up and down directions.

Referring to FIG. 1 to FIG. 4, the upper reinforce unit 80 reinforces the inner upper surface of the wheel housing 3, is mounted on the inner upper surface, and is connected to the side reinforce unit 40.

FIG. 14 is a drawing showing an upper reinforcement unit applied to the frame structure of a commercial vehicle applying an independent suspension system according to one form of the present disclosure.

The upper reinforce unit 80 may include a third pipe member 81 and a fourth pipe member 83.

The third pipe member 81 as a plural is formed with a rectangular cross-section shape and mounted in an arch form on the inner upper surface of the wheel housing 3. And the fourth pipe member 83 as a plural is formed with a rectangular cross-section shape and is mounted on the inner upper surface of the wheel housing 3. The fourth pipe members 83 connect the third pipe members 81 in the vehicle width direction.

FIG. 15 is a drawing showing a third suspension mounting assembly applied to the frame structure of a commercial vehicle applying an independent suspension system according to one form of the present disclosure.

In one form of the present disclosure, a third suspension mounting assembly 93 mounted on the side reinforce unit 40 is further included. The third suspension mounting assembly 93 is for mounting the upper arm of front suspension 1 and the upper of the shock absorber. This third suspension mounting assembly 93 includes a first mounting bracket 95 and a second mounting bracket 96.

The first mounting bracket 95 can be provided as a pair, and the upper arms of the front suspension 1 may be mounted. The first mounting bracket 95 is mounted on the side upper reinforce member 43 of the side reinforce unit 40.

And, to the second mounting bracket 96, the upper shock absorber of the front suspension 1 may be mounted. The second mounting bracket 96 is installed to the first connecting member 45 of the side reinforce unit 40 through a reinforce panel 97.

The frame structure 100 of a commercial vehicle with an independent suspension system configured as described above, unlike the frame structure in the conventional art composed of panels as a whole, may reinforce the front, rear, center, side, lower and upper sides through members with closed cross-sections such as the box shape of the square cross-section and the pipe shape of the square cross-section where channels of "U" cross-section shape are joined.

In addition, the frame structure 100 according to one form of the present disclosure can effectively distribute the load of the front suspension 1 while avoiding interference with the front suspension 1 through the front and rear outriggers 10, 20, and the center reinforce unit 30 and the lower reinforce unit 50.

Accordingly, in one form of the present disclosure, it is advantageous in terms of strength and rigidity, and durability of the frame structure of the vehicle body can be increased more stably.

While this disclosure has been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

DESCRIPTION OF SYMBOLS

| | |
|---|---|
| 1: front suspension | 3: wheel housing |
| 10: front outrigger | 20: rear outrigger |
| 11, 12, 21, 22, 36a, 36b: channel member | |
| 30: center reinforce unit | 31: first reinforce member |
| 32: second reinforce member | 33: third reinforce member |
| 34: fourth reinforce member | 35: fifth reinforce member |
| 40: side reinforce unit | |
| 41: side lower reinforce member | |
| 43: side upper reinforce member | 45: first connecting member |
| 47: second connecting member | 50: lower reinforce unit |
| 51: front upper channel plate | |
| 52: front lower channel plate | |
| 53: rear upper channel plate | |
| 54: rear lower channel plate | |
| 55: center plate | 56: center lower channel member |
| 60: front reinforce unit | |
| 61, 71: first pipe member | |
| 62, 72: second pipe member | 70: rear reinforce unit |
| 80: upper reinforce unit | 81: third pipe member |
| 83: fourth pipe member | |
| 91: first suspension mounting assembly | |
| 92: second suspension mounting assembly | |
| 93: third suspension mounting assembly | |
| 95: first mounting bracket | 96: second mounting bracket |
| 97: reinforce panel | 100: frame structure |

What is claimed is:

1. A frame structure of a commercial vehicle having an independent suspension system, the frame structure comprising:
    a front cross beam mounted at lower front ends of wheel housings along a width direction of a vehicle;
    a rear cross beam mounted at lower rear ends of the wheel housings along the width direction of the vehicle, wherein the wheel housings are arranged between the front cross beam and rear cross beam in a vehicle body length direction;
    a center reinforce unit mounted on an inner lower side of the wheel housings and disposed between the wheel housings, the center reinforce unit configured to connect the front and rear cross beams along the vehicle body length direction;
    a side reinforce unit mounted on an inner side of the wheel housings and connected to the center reinforce unit;
    a lower reinforce unit configured to be connected to the center reinforce unit and coupled to a first suspension mounting assembly through the rear cross beam; and
    an upper reinforce unit mounted on an inner upper surface of the wheel housings and connected to the side reinforce unit.

2. The frame structure of claim 1, further comprising:
    a front reinforce unit mounted on an inner front side of the wheel housings and connected to the front cross beam and the side reinforce unit; and
    a rear reinforce unit mounted on an inner rear side of the wheel housings and connected to the rear cross beam and the side reinforce unit.

3. The frame structure of claim 2, wherein the front and rear reinforce unit comprises:
    a plurality of first pipe members having a rectangular cross-section and disposed along the vehicle width direction; and
    a plurality of second pipe members having a rectangular cross-section, connected to the first pipe members, and disposed in up and down directions.

4. The frame structure of claim 1, wherein the upper reinforce unit comprises:
    at least one third pipe member having a rectangular cross-section and an arch form, and mounted on the inner upper surface of the wheel housings; and
    a fourth pipe member having a square cross-section and connected to the third pipe member in the vehicle width direction.

5. The frame structure of claim 1, further comprising a second suspension mounting assembly mounted on the front cross beam.

6. The frame structure of claim 1, further comprising a third suspension mounting assembly mounted on the side reinforce unit.

7. The frame structure of claim 1, wherein the front and rear cross beams are configured in form of a box with a rectangular cross-section in which channel members having a "U"-shaped cross-section are joined together.

8. The frame structure of claim 1, wherein the center reinforce unit comprises:
    a plurality of first reinforce members mounted on the side reinforce unit, each first reinforce member of the plurality of first reinforce members configured to include at least two channel members respectively having a U-shaped cross-section,
    wherein the at least two channel members are joined to each other, forming a rectangular cross-section, and disposed along the vehicle body length direction; and
    a plurality of second reinforce members mounted on the side reinforce unit, configured to have a square cross-section and disposed in up and down directions between the first reinforce members.

9. The frame structure of claim 8, wherein the center reinforce unit further comprises:
    a third reinforce member mounted on a lower surface of the plurality of first reinforce members, and configured to have a square cross-section;
    a fourth reinforce member having a "U"-shaped cross-section that is open in a downward direction, and mounted on the lower surface of the plurality of first reinforce members; and
    a fifth reinforce member having a "U"-shaped cross-section shape that is open in an upward direction, and mounted on the lower surface of the plurality of first reinforce members.

10. The frame structure of claim 1, wherein the side reinforce unit comprises:
   a side lower reinforce member configured to have a square cross-section, connected to the center reinforce unit, and mounted along the vehicle body length direction on a lower inner side of the wheel housings; and
   a pair of side upper reinforce members configured to have the square cross-section, spaced apart from the side lower reinforce member, and mounted along the vehicle body length direction on a side of the wheel housings.

11. The frame structure of claim 10, wherein the side reinforce unit further comprises:
   a first connecting member configured to have the square cross-section, and connecting the side lower reinforce member and one of the pair of side upper reinforce members in up and down directions between the side lower reinforce member and the one of the pair of side upper reinforce members; and
   a second connecting member configured to have the square cross-section, connecting the side upper reinforce member and an upper surface of the wheel housings, and disposed in the up and down directions.

12. The frame structure of claim 11, further comprising:
   a third suspension mounting assembly mounted on the side reinforce unit,
   wherein the third suspension mounting assembly comprises:
      a pair of first mounting brackets mounted on the side upper reinforce member; and
      a second mounting bracket between the pair of first mounting brackets and configured to be installed to the first connecting member through a reinforce panel.

13. The frame structure of claim 1, wherein the lower reinforce unit comprises:
   a front upper channel plate connected with the center reinforce unit along the vehicle width direction;
   a front lower channel plate coupled to a lower surface of the front upper channel plate;
   a rear upper channel plate disposed apart from the front upper channel plate and connected to the center reinforce unit along the vehicle width direction; and
   a rear lower channel plate connected to a bottom of the rear upper channel plate.

14. The frame structure of claim 13, wherein the lower reinforce unit further comprises:
   a center plate connecting the front upper channel plate and the rear upper channel plate between the front upper channel plate and the rear upper channel plate; and
   a center lower channel member connected to a bottom of the center plate.

15. The frame structure of claim 1, wherein the frame structure is configured in a vehicle body of a two-story electric bus.

* * * * *